(12) United States Patent
Shi et al.

(10) Patent No.: US 11,831,355 B2
(45) Date of Patent: *Nov. 28, 2023

(54) ULTRASONIC DATA TRANSMISSION METHOD, APPARATUS AND SYSTEM, TERMINAL DEVICE AND MEDIUM

(71) Applicant: BEIJING XIAOMI MOBILE SOFTWARE CO., LTD., Beijing (CN)

(72) Inventors: Runyu Shi, Beijing (CN); Yuqing Hua, Beijing (CN); Song Mei, Beijing (CN); Wei Lu, Beijing (CN); Lin Zhang, Beijing (CN); Naichao Guo, Beijing (CN); Kai Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 11 days.

This patent is subject to a terminal disclaimer.

(21) Appl. No.: 17/213,176

(22) Filed: Mar. 25, 2021

(65) Prior Publication Data

US 2021/0409126 A1    Dec. 30, 2021

(30) Foreign Application Priority Data

Jun. 29, 2020 (CN) .......................... 202010604375.4

(51) Int. Cl.
*H04B 11/00* (2006.01)
*G10L 19/00* (2013.01)

(52) U.S. Cl.
CPC .......... *H04B 11/00* (2013.01); *G10L 19/0017* (2013.01)

(58) Field of Classification Search
CPC . H04L 1/00; H04M 1/24; H04B 13/00; H04B 11/00; G01S 15/89; G08C 17/02; G10L 19/0017

See application file for complete search history.

(56) References Cited

U.S. PATENT DOCUMENTS

| 5,018,114 A * | 5/1991 | Mackelburg | H04B 11/00 367/134 |
| 6,763,106 B1 * | 7/2004 | Li | H04M 1/50 379/283 |

(Continued)

FOREIGN PATENT DOCUMENTS

| CN | 101845950 A | 9/2010 |
| CN | 202406118 U | 8/2012 |

(Continued)

OTHER PUBLICATIONS

Extended European Search Report in the European Application No. 21165134.4, dated Sep. 30, 2021, (10p).

(Continued)

*Primary Examiner* — Isam A Alsomiri
*Assistant Examiner* — Joseph C Fritchman
(74) *Attorney, Agent, or Firm* — Arch & Lake LLP

(57) ABSTRACT

An ultrasonic data transmission method, apparatus and system, a terminal device and a medium are provided. The method is applied to a transmitting terminal which includes at least two ultrasonic signal transmitting arrays. The method includes: a single-frequency ultrasonic coding signal of to-be-transmitted information corresponding to each ultrasonic signal transmitting array is respectively determined, ultrasonic codes of to-be-transmitted information corresponding to different ultrasonic signal transmitting arrays being different; and corresponding at least two single-frequency ultrasonic code signals are transmitted through the at least two ultrasonic signal transmitting arrays to a receiving terminal in a focusing mode, frequency bands of transmitting frequencies of different ultrasonic signal transmitting arrays being different.

18 Claims, 4 Drawing Sheets

(56) References Cited

U.S. PATENT DOCUMENTS

| | | | |
|---|---|---|---|
| 9,361,877 | B2 | 6/2016 | Yeary |
| 10,176,815 | B1 | 1/2019 | Chmiel |
| 11,275,164 | B2 | 3/2022 | Yoon |
| 2009/0145232 | A1 | 6/2009 | Suginouchi |
| 2012/0218865 | A1 | 8/2012 | Dinter |
| 2013/0114380 | A1 | 5/2013 | Bryger |
| 2013/0271088 | A1 | 10/2013 | Hwang et al. |
| 2013/0294050 | A1 | 11/2013 | Lee |
| 2013/0315039 | A1 | 11/2013 | Ahn et al. |
| 2014/0043933 | A1* | 2/2014 | Belevich ............ A61B 6/584 367/7 |
| 2014/0050321 | A1 | 2/2014 | Albert |
| 2014/0119162 | A1 | 5/2014 | Yeary et al. |
| 2015/0176988 | A1 | 6/2015 | Cho et al. |
| 2016/0352435 | A1 | 12/2016 | Yoshizawa et al. |
| 2017/0141811 | A1 | 5/2017 | Gabai et al. |
| 2017/0279571 | A1 | 9/2017 | Melodia et al. |
| 2018/0255111 | A1* | 9/2018 | Zhang ............... H04B 1/713 |
| 2018/0365981 | A1 | 12/2018 | Nakayama et al. |
| 2019/0281547 | A1 | 9/2019 | Yoon |
| 2020/0074844 | A1* | 3/2020 | Mirzavand Boroujeni ............ G01D 21/02 |
| 2022/0085941 | A1* | 3/2022 | Chen ............... H04L 5/0092 |
| 2022/0096852 | A1 | 3/2022 | Alvarez |

FOREIGN PATENT DOCUMENTS

| | | | |
|---|---|---|---|
| CN | 103806902 | A | 5/2014 |
| CN | 103959201 | A | 7/2014 |
| CN | 104901779 | A | 9/2015 |
| CN | 105187282 | A | 12/2015 |
| CN | 105356948 | A | 2/2016 |
| CN | 105846911 | A | 8/2016 |
| CN | 106095143 | A | 11/2016 |
| CN | 106600922 | A | 4/2017 |
| CN | 107197069 | A | 9/2017 |
| CN | 107645343 | A | 1/2018 |
| CN | 108075837 | A | 5/2018 |
| CN | 109166593 | A | 1/2019 |
| CN | 109814457 | A | 5/2019 |
| CN | 109936670 | A | 6/2019 |
| CN | 110235022 | A | 9/2019 |
| CN | 111445649 | A | 7/2020 |
| CN | 111769885 | A | 10/2020 |
| CN | 111782284 | A | 10/2020 |
| CN | 111884728 | A | 11/2020 |
| EP | 2950467 | A1 * | 12/2015 ............ H04B 11/00 |
| EP | 2950467 | A1 | 12/2015 |
| EP | 3098983 | A1 | 11/2016 |
| EP | 3393063 | A1 | 10/2018 |
| KR | 101597657 | B1 | 2/2016 |
| NO | 2010051728 | A1 | 5/2010 |
| WO | 2016001879 | A1 | 1/2016 |
| WO | 2018160436 | A1 | 9/2018 |
| WO | 2019182646 | A1 | 9/2019 |

OTHER PUBLICATIONS

First Office Action of the Chinese Application No. 202010604375.4, dated Mar. 29, 2021 with English translation, (15p).
Author: Night Ranger, Title: Principles of Alipay's Sonic Payment (Pay in Person), Source: Zhihu, Link: https://www.zhihu.com/question/20946901/answer/41899098, (4p).
Second Office Action of the Chinese application No. 202010604375.4, dated Nov. 26, 2021.
Notice of Allowance of the Chinese application No. 202010604375.4, dated Jan. 17, 2022.
First Office Action of the Chinese application No. 202011272464.X, dated Aug. 4, 2021.
European Search Report in the European application No. 21176418.8, dated Nov. 19, 2021.
First Office Action of the Chinese application No. 202010591091.6, dated Apr. 1, 2021.
Notice of Allowance of the Chinese application No. 202010591091.6, dated Sep. 8, 2021.
European Search Report in the European application No. 21165719.2, dated Sep. 28, 2021.
First Office Action of the U.S. Appl. No. 17/205,431, dated Sep. 29, 2022.
Office Action of the Indian application No. 202144013069, dated Feb. 4, 2022.
Non-Final Office Action of the U.S. Appl. No. 17/334,269, dated Jun. 8, 2023. 36 pages.

\* cited by examiner

| A single-frequency ultrasonic coding signal of to-be-transmitted information corresponding to each ultrasonic signal transmitting array is respectively determined, ultrasonic codes of to-be-transmitted information corresponding to different ultrasonic signal transmitting arrays being different | — S101 |

| Corresponding at least two single-frequency ultrasonic coding signals are transmitted through the at least two ultrasonic signal transmitting arrays to a receiving terminal in a focusing mode, frequency bands of transmitting frequencies of different ultrasonic signal transmitting arrays being different | — S102 |

FIG. 1

FIG. 2

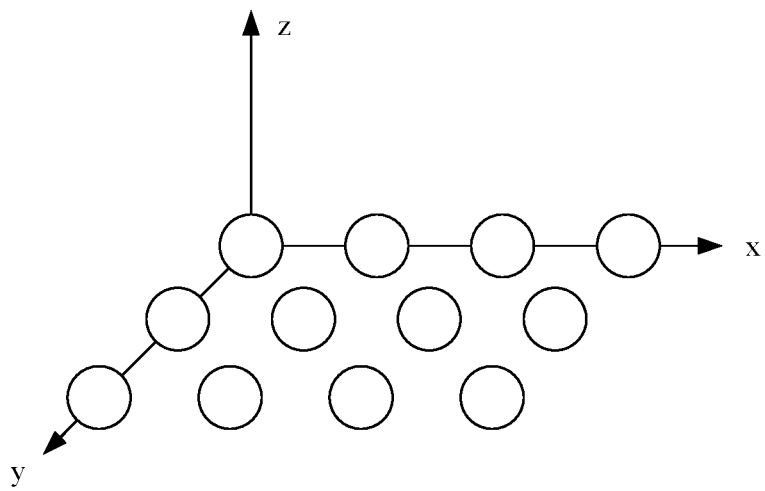

FIG. 3

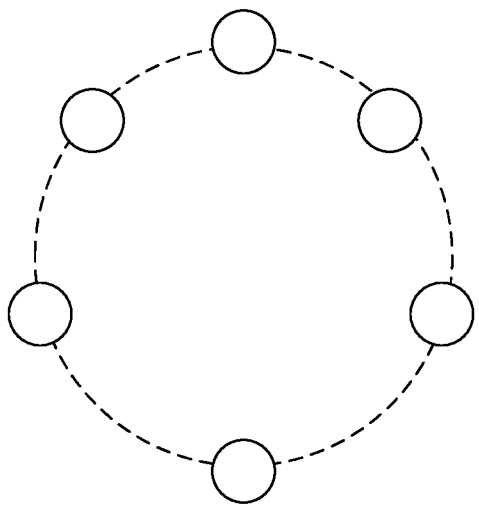

FIG. 4

ULTRASONIC DATA TRANSMISSION METHOD, APPARATUS AND SYSTEM, TERMINAL DEVICE AND MEDIUM

CROSS-REFERENCE TO RELATED APPLICATION

The present application is based upon and claims priority to Chinese Patent Application 202010604375.4, filed on Jun. 29, 2020, the entire content of which is incorporated herein by reference for all purposes.

TECHNICAL FIELD

The present disclosure generally relates to the technical field of communications, and more particularly, to an ultrasonic data transmission method, apparatus and system, a terminal device and a medium.

BACKGROUND

There are a variety of information transmission modes which mainly include wired communication and wireless communication. Specifically, the wired communication refers to that information is transmitted by using physical media such as metal wires, optical fibers or the like; and the wireless communication refers to that long-distance transmission communication among multiple nodes is performed by using no conductors or cables, and refers to ultrasonic communication, infrared communication, Bluetooth communication, wireless fidelity (Wi-Fi) communication or the like. During the ultrasonic communication, to-be-transmitted information is encoded and transmitted through ultrasonic arrays, and the information is decoded subsequently, thereby completing the transmission of data.

However, during the implementation of the present disclosure, at least the following problems in a related art are found by the inventor: an ultrasonic signal has single source direction and coding mode, which results in low accuracy of communication results; and the ultrasonic signal is cracked easily to cause information leakage.

SUMMARY

According to a first aspect, the present disclosure provides an ultrasonic data transmission method, which may be applied to a transmitting terminal. The transmitting terminal may include at least two ultrasonic signal transmitting arrays, and the method may include: determining a single-frequency ultrasonic coding signal of to-be-transmitted information corresponding to each ultrasonic signal transmitting array, wherein ultrasonic codes of to-be-transmitted information corresponding to different ultrasonic signal transmitting arrays is different; and transmitting, through the at least two ultrasonic signal transmitting arrays, corresponding at least two single-frequency ultrasonic coding signals to a receiving terminal in a focusing mode, wherein frequency bands of transmitting frequencies of different ultrasonic signal transmitting arrays are different.

According to a second aspect, the present disclosure provides an ultrasonic data transmission method, which may be applied to a receiving terminal, and include: receiving an ultrasonic transmission signal transmitted by a transmitting terminal; determining whether the ultrasonic transmission signal is transmitted by at least two ultrasonic signal transmitting arrays in the transmitting terminal; and decoding the ultrasonic transmission signal when determining that the ultrasonic transmission signal is transmitted by the at least two ultrasonic signal transmitting arrays in the transmitting terminal.

According to a third aspect, the present disclosure provides an ultrasonic data transmission apparatus, which may be applied to a transmitting terminal. The transmitting terminal may include at least two ultrasonic signal transmitting arrays, and the apparatus may include: a processor and a memory for storing instructions executable by the processor; the processor is configured to: determine a single-frequency ultrasonic coding signal of to-be-transmitted information corresponding to each ultrasonic signal transmitting array, wherein ultrasonic codes of to-be-transmitted information corresponding to different ultrasonic signal transmitting arrays are different; and transmit, through the at least two ultrasonic signal transmitting arrays, corresponding at least two single-frequency ultrasonic coding signals to a receiving terminal in a focusing mode, wherein frequency bands of transmitting frequencies of different ultrasonic signal transmitting arrays are different.

According to a fourth aspect, the present disclosure provides an ultrasonic data transmission apparatus, which may be applied to a receiving terminal, and include: a processor and a memory for storing instructions executable by the processor; the processor is configured to: receive an ultrasonic transmission signal transmitted by a transmitting terminal; determine whether the ultrasonic transmission signal is transmitted by at least two ultrasonic signal transmitting arrays in the transmitting terminal; and decode the ultrasonic transmission signal when determining that the ultrasonic transmission signal is transmitted by the at least two ultrasonic signal transmitting arrays in the transmitting terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

FIG. 1 is a flow chart showing an ultrasonic data transmission method, according to an example of the present disclosure.

FIG. 2 is a schematic diagram of a linear ultrasonic signal transmitting array, according to an example of the present disclosure.

FIG. 3 is a schematic diagram of a two-dimensional planar ultrasonic signal transmitting array, according to an example of the present disclosure.

FIG. 4 is a schematic diagram of a round ultrasonic signal transmitting array, according to an example of the present disclosure.

DETAILED DESCRIPTION

Figure 5:
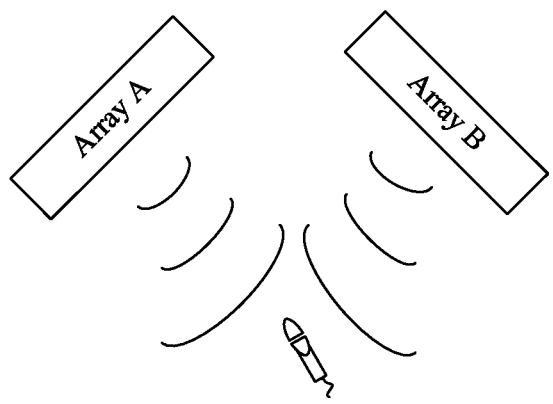
FIG. 5 is a schematic diagram of focusing transmission, according to an example of the present disclosure.

In order to make those skilled in the art better understand the solutions of the present application, the technical solutions in the examples of the present application will be clearly and completely described below with reference to the drawings in the examples of the present application. It is apparent that the described examples are only a part of the examples of the present application, not all of the examples. All other examples obtained by those skilled in the art based on the examples of the present disclosure without creative efforts shall fall within the protection scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms such as "first", "second", "third" and "fourth" (if exist) in the examples of the specification, claims and accompanying drawings of the present disclosure are only used to distinguish similar objects, rather than to describe a special order or a precedence order. It should be understood that data used in such a way may be interchangeable in a certain cases, such that the examples of the present disclosure described here can be implemented in an order other than those illustrated or described here.

As used herein, the term "if" or "when" may be understood to mean "upon" or "in response to" depending on the context. These terms, if appear in a claim, may not indicate that the relevant limitations or features are conditional or optional.

In addition, the terms "comprise", "include" and "have" or any other variation thereof are intended to cover a non-exclusive inclusion. For example, a process, method, system, product or device that includes a series of steps or modules or units are not necessarily limited to only those steps or modules or units expressly listed but may include other steps or modules not expressly listed or inherent to such process, method, product or device.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

For the ease of understanding and description, an ultrasonic data transmission method, apparatus and system, a terminal device and a medium provided by examples of the present disclosure will be described in detail through FIG. 1 to FIG. 13.

Referring to FIG. 1, FIG. 1 is a flow chart showing an ultrasonic data transmission method, according to an example of the present disclosure. The method may be applied to a transmitting terminal. The transmitting terminal may include at least two ultrasonic signal transmitting arrays, and the method may specifically include the following operations.

At S101, a single-frequency ultrasonic coding signal of to-be-transmitted information corresponding to each ultrasonic signal transmitting array is respectively determined, ultrasonic codes of to-be-transmitted information corresponding to different ultrasonic signal transmitting arrays being different.

Optionally, the ultrasonic signal transmitting array includes at least one ultrasonic signal transmitter, and the ultrasonic signal transmitter(s) may be arranged according to a preset rule. The ultrasonic signal transmitter may include, but is not limited to, at least one of a speaker element or an ultrasonic transmitter. The preset rule may include, but is not limited to, any of a linear arrangement rule, a two-dimensional planar arrangement rule or a surrounded arrangement rule that respectively corresponds to the ultrasonic signal transmitting array illustrated in FIGS. 2-4. In the figures, each circle represents one ultrasonic signal transmitter.

The example of the present disclosure takes the linear ultrasonic signal transmitting array obtained according to the linear arrangement rule as an example for description, and the two-dimensional planar ultrasonic signal transmitting array obtained according to the two-dimensional planar arrangement rule or the round ultrasonic signal transmitting array obtained according to the surrounded arrangement rule are similar. The linear ultrasonic signal transmitting array includes a row of ultrasonic signal transmitters, and is arranged linearly as required by sound field. The linear ultrasonic signal transmitting array generates ultrasonic signals by using a nonlinear effect of the ultrasonic carrier in the air medium during propagation, and has the advantages of regular arrangement, high power, far projection distance, uniform sound field coverage and the like.

Optionally, the at least one ultrasonic signal transmitter in a same ultrasonic signal transmitting array adopts a same transmitting frequency. Since different ultrasonic signal transmitting arrays adopt different transmitting frequencies, corresponding ultrasonic signal transmitting arrays may be identified according to the transmitting frequencies; and the receiving terminal performs the decoding when receiving the signals transmitted by the at least two ultrasonic signal transmitting arrays, thereby preventing the influence from an interference signal and improving the accuracy of a communication result.

It is to be noted that the to-be-transmitted information corresponding to different ultrasonic signal transmitting arrays is identical, but the corresponding to-be-transmitted information adopts different ultrasonic coding modes, such that the crack difficulty is increased, and the security of information protection is enhanced. The to-be-transmitted information may include, but is not limited to, text information, instruction information, and the like.

The ultrasonic coding mode on the to-be-transmitted information will be described below in detail. The example(s) of the present disclosure may acquire respective coding tables of at least two ultrasonic signal transmitting arrays, and perform ultrasonic coding on the to-be-transmitted information according to the respective coding tables; and then, perform co-frequency processing on ultrasonic codes to generate the single-frequency ultrasonic coding signal of each ultrasonic signal transmitting array.

Optionally, the respective coding tables of the at least two ultrasonic signal transmitting arrays are different, such as an American standard code for information interchange (ASCII) coding table and a Unicode coding table; or, the respective coding tables of the at least two ultrasonic signal transmitting arrays are the same. When the coding tables are the same, the example(s) of the present disclosure may respectively acquire a system digit in the coding tables of each character in the to-be-transmitted information, the systems selected by the at least two ultrasonic signal transmitting arrays being different; and thus, the ultrasonic code corresponding to each system digit is generated based on a pre-stored digit-frequency corresponding table.

With the ASCII coding table as an example, a character 'a' has a hexadecimal digit of 61 and an octal digit of 141. According to a digit-frequency corresponding table of Table 1, the frequency corresponding to the hexadecimal digit of the character 'a' is 24 kHz and 19 kHz, and the frequency corresponding to the octal digit is 19 kHz, 22 kHz and 19 kHz. It is to be noted that the sound frequency should be above 18 kHz to which the ordinary people cannot or are hard to listen, thereby ensuring the security of information transmission.

TABLE 1

Digit-frequency corresponding table

| Digit | Frequency |
|---|---|
| 1 | 19 kHz |
| 2 | 20 kHz |
| 3 | 21 kHz |
| 4 | 22 kHz |
| 5 | 23 kHz |
| 6 | 24 kHz |

Optionally, the example(s) of the present disclosure may sequentially split each system digit to obtain a sub-digit sequence, and search for the frequency sequence corresponding to the sub-digit sequence in the digit-frequency corresponding table, the sub-digit sequence including at least one sub-digit. Then, the example(s) may excite each frequency sequence to generate the ultrasonic coding signal.

For example, the example(s) of the present disclosure may generate the ultrasonic coding signal by sinusoidal excitation. Each frequency in each frequency sequence is generated by the following formula, i.e., $$Y_1 = \sin(2\pi \omega t) \tag{1}$$

In the formula (1), $Y_1$ represents the obtained ultrasonic coding signal, the $\omega$ corresponds to each frequency in each frequency sequence, and t represents the duration component. It is to be noted that supposing that the decoder in the receiving terminal has a frame length of L sampling points, the length of t is more than k*L, k representing an anti-noise coefficient, such as k=3.

Optionally, after exciting each frequency sequence, the example(s) of the present disclosure may further connect each frequency sequence according to an excitation time sequence of each frequency sequence so as to perform the co-frequency processing, add fade-in at a front end of a first frequency sequence, and add fade-out at a tail end of a last frequency sequence. The fade-in and fade-out mode may include, but is not limited to, any one of linear interpolation or exponent interpolation.

Optionally, when each frequency sequence is connected, if adjacent frequency sequences have the same frequency, the adjacent frequency sequences are directly connected. If the adjacent frequency sequences have different frequencies, the adjacent frequency sequences are in frequency shift connection. Thus, each frequency sequence is combined to generate the single-frequency ultrasonic coding signal of the ultrasonic signal transmitting array.

For example, supposing that the frequencies of the adjacent frequency sequences are respectively $f_0$ and $f_1$, and the frequency shift duration is n sampling points, the frequency shift mode is performed through formula (2) or formula (3), i.e., $$Y_2 = \sin(2\pi(f_0 + Kt)t) \tag{2}$$

$$Y_3 = \sin\left(\frac{2\pi \ (f_0 + K^t)}{\log K}\right) \tag{3}$$

In the formula (2) and the formula (3), $Y_2$ and $Y_3$ represent the ultrasonic coding signals at the junction, t=0, 1, . . . , (n−1), and K represents a frequency shift rate.

$$K = \frac{(f_1 - f_0)}{n} \tag{4}$$

Optionally, the to-be-transmitted information in the example(s) of the present disclosure includes wake-up information. Such an arrangement has the advantage that the receiving terminal determines whether to perform the decoding by detecting whether the to-be-transmitted information includes the wake-up information, and is unnecessarily in a turn-on state all the time, thus saving the power consumption.

At S102, corresponding at least two single-frequency ultrasonic coding signals are transmitted through the at least two ultrasonic signal transmitting arrays to a receiving terminal in a focusing mode, frequency bands of transmitting frequencies of different ultrasonic signal transmitting arrays being different.

For example, as illustrated in FIG. 5, the example(s) of the present disclosure may adopt horizontal and vertical linear ultrasonic signal transmitting arrays that are respectively an array A and an array B. Optionally, the at least two ultrasonic signal transmitting arrays are distributed in an angle of less than 180°.

It is to be noted that the same array transmits the single-frequency ultrasonic coding signal of the same frequency, and the frequency value of the array is a constant. Supposing that the array has a frequency in a range of 19 kHz to 23 kHz, the frequency a of the array A may be any integer between 19 kHz to 21 kHz, the frequency b of the array B may be any integer between 21 kHz and 23 kHz, and each array includes m ultrasonic signal transmitters.

Since the array A and the array B transmit different single-frequency ultrasonic coding signals, the corresponding sonic value transmitted by each array and calculated through the formula (2) or the formula (3) is $Y = [y_0, y_1, \ldots, y_m]$, where Y represents the single-frequency ultrasonic coding signal and $y_0, y_1, \ldots, y_m$ represents the sound signal generated by the ultrasonic signal transmitter.

The example of the present disclosure provides the ultrasonic data transmission method. Single-frequency ultrasonic coding signals of corresponding to-be-transmitted information are transmitted through at least two ultrasonic signal transmitting arrays. Since ultrasonic coding modes of to-be-transmitted information corresponding to different ultrasonic signal transmitting arrays are different, the crack difficulty is increased, and the security of information protection is enhanced. And meanwhile, corresponding at least two single-frequency ultrasonic coding signals are transmitted through the at least two ultrasonic signal transmitting arrays to a receiving terminal in a focusing mode, such that the receiving terminal performs the decoding when receiving the signals transmitted by the at least two ultrasonic signal transmitting arrays, thereby preventing the influence from an interference signal and improving the accuracy of a communication result.

Figure 6:
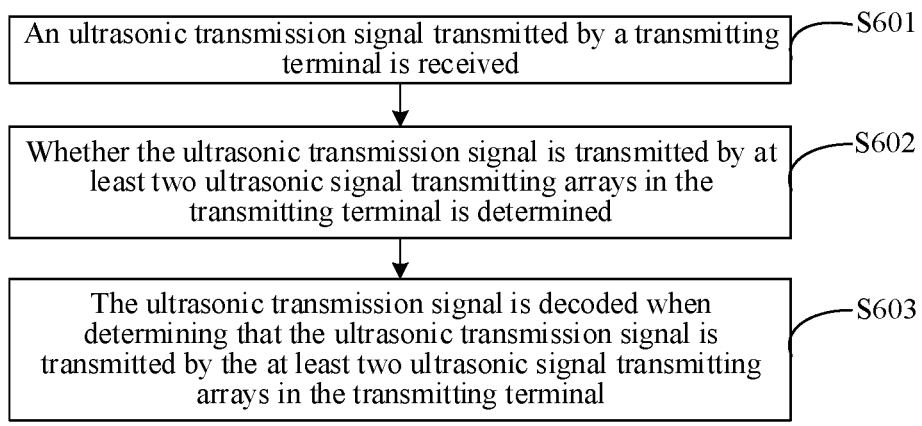
FIG. 6 is a flow chart showing another ultrasonic data transmission method, according to an example of the present disclosure.

Based on the preceding example, as illustrated in FIG. 6, FIG. 6 is a flow chart showing another ultrasonic data transmission method, according to an example of the present disclosure. The method may be applied to a receiving terminal, and specifically include the following operations.

At S601, an ultrasonic transmission signal transmitted by a transmitting terminal is received.

Specifically, as illustrated in FIG. 5, the receiving terminal is located nearby focuses of at least two ultrasonic signal transmitting arrays for transmitting in a focusing mode, and receives, through a signal receiver such as a microphone, the ultrasonic transmission signal transmitted by the transmitting terminal.

At S602, whether the ultrasonic transmission signal is transmitted by at least two ultrasonic signal transmitting arrays in the transmitting terminal is determined.

Optionally, the example(s) of the present disclosure may perform frequency domain transformation on the ultrasonic transmission signal, and calculate an energy value of each frequency component in the ultrasonic transmission signal subjected to the frequency domain transformation. When at least two energy values are greater than a preset energy threshold, it is determined that the ultrasonic transmission signal is transmitted by the at least two ultrasonic signal transmitting arrays in the transmitting terminal. Since the ultrasonic transmission signal may be mixed with an interference signal, and the interference signal has an energy value less than the preset energy threshold, the example(s) of the present disclosure may determine the number of ultrasonic signal transmitting arrays by comparing the energy value of each frequency component with the preset energy threshold.

For example, the energy value of each frequency component is calculated according to formula (5), i.e., $$f(x) = a_0 + \sum_{l=1}^{\infty} \left( a_l \cos \frac{l\pi x}{L} + b_l \sin \frac{l\pi x}{L} \right) \quad (5)$$

In the formula (5), $a_0$, $a_l$ and $b_l$ represent the Fourier coefficient, L represents the number of sampling points, and l represents the resolution of the frequency domain, i.e., the number of frequency components.

At S603, the ultrasonic transmission signal is decoded when determining that the ultrasonic transmission signal is transmitted by the at least two ultrasonic signal transmitting arrays in the transmitting terminal.

Optionally, the example(s) of the present disclosure may first convert the ultrasonic transmission signal into at least two single-frequency ultrasonic coding signals, the at least two single-frequency ultrasonic coding signals being respectively transmitted by the at least two ultrasonic signal transmitting arrays in a focusing manner; and then acquire any single-frequency ultrasonic coding signal and decode the single-frequency ultrasonic coding signal. For example, the receiving terminal performs the decoding according to the coding table of the ultrasonic signal transmitting array corresponding to the single-frequency ultrasonic coding signal. Since the to-be-transmitted information corresponding to the different ultrasonic signal transmitting arrays is identical, the receiving terminal performs the decoding when receiving the signals transmitted by the at least two ultrasonic signal transmitting arrays, thereby preventing the influence from an interference signal and improving the accuracy of a communication result.

Optionally, when acquiring any single-frequency ultrasonic coding signal and decoding the single-frequency ultrasonic coding signal, the example(s) of the present disclosure may detect whether the single-frequency ultrasonic coding signal includes wake-up information; and thus, when the single-frequency ultrasonic coding signal includes the wake-up information, the example(s) may separate the wake-up information from the single-frequency ultrasonic coding signal and decode remaining information except the wake-up information to obtain to-be-transmitted information. Thus, the receiving terminal determines whether to perform the decoding by detecting whether the single-frequency ultrasonic coding signal includes the wake-up information, and is unnecessarily in a turn-on state all the time, thus saving the power consumption.

It is to be noted that the descriptions on the same steps and same contents in the examples with the other examples may refer to the descriptions in the other examples, and will not be repeated herein.

The example of the present disclosure provides the ultrasonic data transmission method. Single-frequency ultrasonic coding signals of corresponding to-be-transmitted information are transmitted through at least two ultrasonic signal transmitting arrays. Since ultrasonic coding modes of to-be-transmitted information corresponding to different ultrasonic signal transmitting arrays are different, the crack difficulty is increased, and the security of information protection is enhanced. And meanwhile, corresponding at least two single-frequency ultrasonic coding signals are transmitted through the at least two ultrasonic signal transmitting arrays to a receiving terminal in a focusing mode, such that the receiving terminal performs the decoding when receiving the signals transmitted by the at least two ultrasonic signal transmitting arrays, thereby preventing the influence from an interference signal and improving the accuracy of a communication result.

For the ease of better understanding on the ultrasonic data transmission method according to the examples of the present disclosure, the descriptions are first made to an ultrasonic data transmission system adopting the ultrasonic data transmission method.

Figure 7:
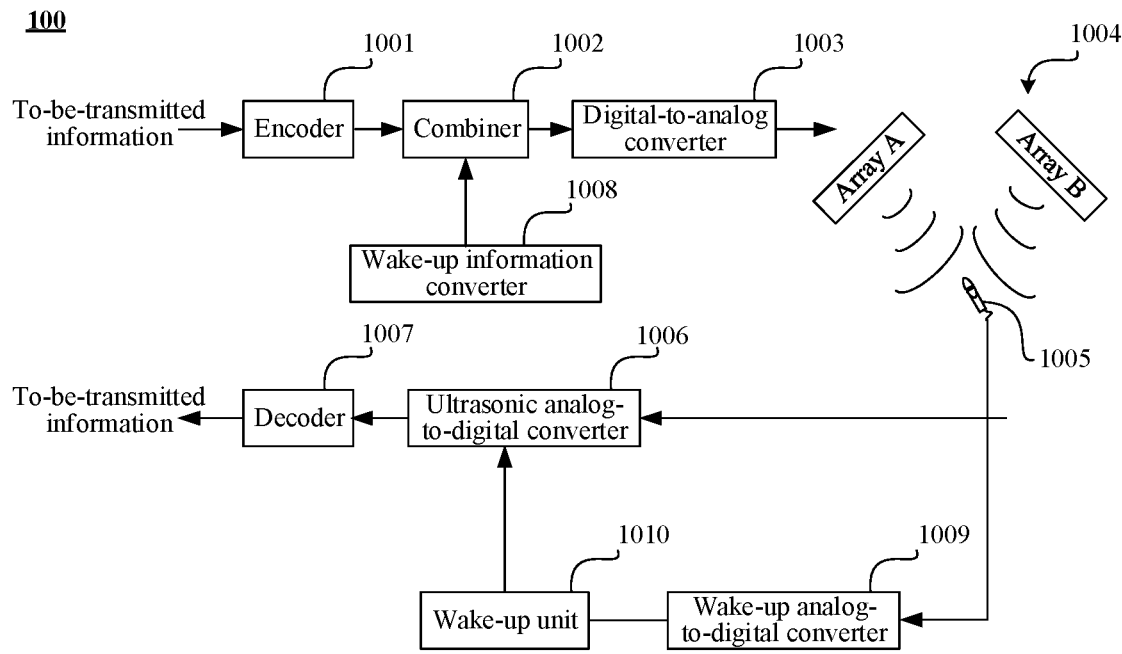
FIG. 7 is a schematic diagram of an ultrasonic data transmission system, according to an example of the present disclosure.

Referring to FIG. 7, FIG. 7 is a schematic diagram of an ultrasonic data transmission system, according to an example of the present disclosure. The transmission system 100 includes a transmitting terminal corresponding to the examples of FIGS. 1-5 and a receiving terminal corresponding to the example of FIG. 6.

The transmitting terminal includes an encoder 1001, a combiner 1002, a digital-to-analog converter 1003 and a sonic transmitter 1004; and the sonic transmitter 1004 includes at least two ultrasonic signal transmitting arrays such as an array A and an array B. Correspondingly, the receiving terminal includes a sonic receiver 1005, an ultrasonic analog-to-digital converter 1006 and a decoder 1007.

Optionally, the transmitting terminal in the example of the present disclosure further includes a wake-up information generator 1008; and correspondingly, the receiving terminal further includes a wake-up analog-to-digital converter 1009 and a wake-up unit 1010.

Specifically, the encoder 1001 in the transmitting terminal includes a corresponding frequency generation module, a signal generation module and a signal combination module. The corresponding frequency generation module is configured to respectively perform ultrasonic coding on to-be-transmitted information according to a respective coding table of an ultrasonic signal transmitting array; the signal generation module is configured to perform sinusoidal excitation on an ultrasonic code to generate an ultrasonic coding signal; and the signal combination module is configured to perform co-frequency processing on the ultrasonic coding signal and then transmit the ultrasonic coding signal to the combiner 1002. When the wake-up information generator 1008 generates the wake-up information, the combiner 1002 combines the ultrasonic coding signal subjected to the co-frequency processing with the wake-up information, the information is converted into a single-frequency ultrasonic coding signal by the digital-to-analog converter 1003, and the single-frequency ultrasonic coding signal is transmitted by the sonic transmitter 1004 to the receiving terminal in a focusing mode.

Correspondingly, the sonic receiver 1005 in the receiving terminal receives an ultrasonic transmission signal propagated by the air, the ultrasonic analog-to-digital converter 1006 converts the ultrasonic transmission signal into at least two single-frequency ultrasonic coding signals, and then the decoder 1007 acquires any single-frequency ultrasonic coding signal for decoding. Or during this process, the wake-up unit 1010 detects whether the single-frequency ultrasonic coding signal includes wake-up information, and sends, when the single-frequency ultrasonic coding signal includes the wake-up information, a wake-up instruction to the ultrasonic analog-to-digital converter 1006; and the ultrasonic analog-to-digital converter 1006 separates the wake-up information from the single-frequency ultrasonic coding signal and transmits remaining information except the wake-up information to the decoder 1007 for decoding, thereby obtaining the to-be-transmitted information. Since the to-be-transmitted information includes text information and/or instruction information, the receiving terminal stores the text information, or executes any instructions corresponding to the instruction information.

Figure 8:
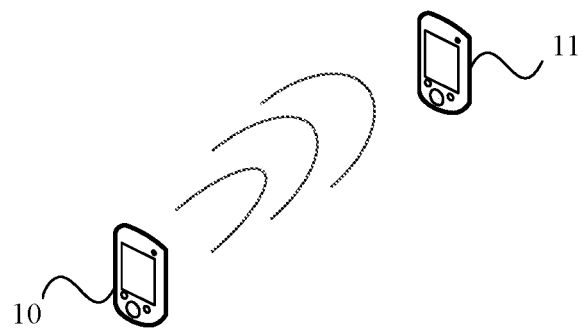
FIG. 8 is a schematic diagram of an application scenario of an ultrasonic data transmission method, according to an example of the present disclosure.

Next, the descriptions are made in combination with the actual application scenario. Referring to FIG. 8, FIG. 8 is a schematic diagram of an application scenario of an ultrasonic data transmission method, according to an example of the present disclosure. The application scenario includes a terminal device 10 and a terminal device 11, and both are connected/coupled by an ultrasonic wave.

For example, when the terminal device 10 is a collection device such as a cash register, the terminal device 11 is a payment device such as a mobile phone. At this time, the terminal device 10 as the transmitting terminal sends a payment identifier (ID) to the terminal device 11 by using the ultrasonic wave; and the terminal device 11 as the receiving terminal activates a corresponding payment interface according to the payment ID after waked up so as to complete a payment action. Compared with scanning payment, in the ultrasonic data transmission method provided by the example(s) of the present disclosure, a user only gets the payment device close to the collection device to automatically activate the payment interface, and unnecessarily activates the camera for scanning, such that the operation is more convenient and quicker.

For example, both the terminal device 10 and the terminal device 11 are mobile terminals such as mobile phones. At this time, the terminal device 10 as the transmitting terminal sends a Wi-Fi service set identifier (SSID) and a password to the terminal device 11 through the ultrasonic wave, and the terminal device 11 as the receiving terminal is connected to the Wi-Fi after receiving corresponding information, thereby improving the efficiency.

For example, the terminal device 10 is a Bluetooth device, and the terminal device 11 is a mobile device such as a mobile phone. When the transmitting terminal needs to transmit a great deal of information, the terminal device 10 sends a Bluetooth ID to the terminal device 11 by using the ultrasonic wave, and the terminal device 11 as the receiving terminal automatically completes a Bluetooth connection after acquiring the Bluetooth ID, thereby saving the time consumed for manual binding.

It is to be noted that those skilled in the art may understood that the application scenario illustrated in FIG. 8 is illustrative and does not form a limit to the ultrasonic data transmission method.

The example of the present disclosure provides the ultrasonic data transmission method. A transmitting terminal transmits single-frequency ultrasonic coding signals of corresponding to-be-transmitted information through at least two ultrasonic signal transmitting arrays. Since ultrasonic coding modes of to-be-transmitted information corresponding to different ultrasonic signal transmitting arrays are different, the crack difficulty is increased, and the security of information protection is enhanced. And meanwhile, corresponding at least two single-frequency ultrasonic coding signals are transmitted through the at least two ultrasonic signal transmitting arrays to a receiving terminal in a focusing mode, such that the receiving terminal performs the decoding when receiving the signals transmitted by the at least two ultrasonic signal transmitting arrays, thereby preventing the influence from an interference signal and improving the accuracy of a communication result.

Figure 9:
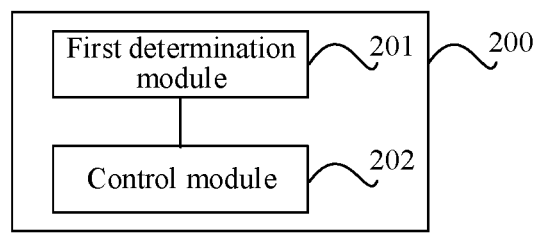
FIG. 9 is a structural diagram of an ultrasonic data transmission apparatus, according to an example of the present disclosure.

Based on the preceding example, an example of the present disclosure provides an ultrasonic data transmission apparatus. The apparatus may be applied to the ultrasonic data transmission method according to the examples of FIGS. 1-5. Referring to FIG. 9, the ultrasonic data transmission apparatus 200 may be applied to a transmitting terminal; and the transmitting terminal may include at least two ultrasonic signal transmitting arrays. Specifically, the ultrasonic data transmission apparatus 200 may include: a first determination module 201 and a control module 202.

The first determination module 201 is configured to respectively determine a single-frequency ultrasonic coding signal of to-be-transmitted information corresponding to each ultrasonic signal transmitting array, and ultrasonic codes of to-be-transmitted information corresponding to different ultrasonic signal transmitting arrays are different.

The control module 202 is configured to transmit, through the at least two ultrasonic signal transmitting arrays, corresponding at least two single-frequency ultrasonic coding signals to a receiving terminal in a focusing mode, and frequency bands of transmitting frequencies of different ultrasonic signal transmitting arrays are different.

Optionally, the ultrasonic signal transmitting array includes at least one ultrasonic signal transmitter, and the ultrasonic signal transmitter(s) may be arranged according to a preset rule.

Optionally, the present rule includes any of a linear arrangement rule, a two-dimensional planar arrangement rule or a surrounded arrangement rule.

Optionally, the at least two ultrasonic signal transmitting arrays are distributed in an angle of less than 180°.

Optionally, the to-be-transmitted information corresponding to different ultrasonic signal transmitting arrays is identical.

Optionally, the at least one ultrasonic signal transmitter in a same ultrasonic signal transmitting array adopts a same transmitting frequency.

It is to be noted that the descriptions on the same steps and same contents in the example with the other examples may refer to the descriptions in the other examples, and will not be repeated herein.

The example of the present disclosure provides the ultrasonic data transmission apparatus. Single-frequency ultrasonic coding signals of corresponding to-be-transmitted information are transmitted through at least two ultrasonic signal transmitting arrays. Since ultrasonic coding modes of to-be-transmitted information corresponding to different ultrasonic signal transmitting arrays are different, the crack difficulty is increased, and the security of information protection is enhanced. And meanwhile, corresponding at least two single-frequency ultrasonic coding signals are transmitted through the at least two ultrasonic signal transmitting arrays to a receiving terminal in a focusing mode, such that the receiving terminal performs the decoding when receiving the signals transmitted by the at least two ultrasonic signal transmitting arrays, thereby preventing the influence from an interference signal and improving the accuracy of a communication result.

Figure 10:
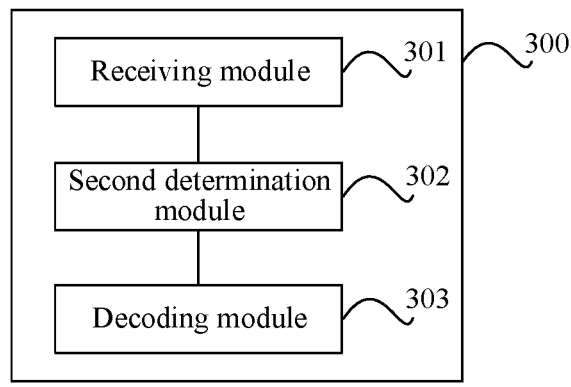
FIG. 10 is a structural diagram of another ultrasonic data transmission apparatus, according to an example of the present disclosure.

Based on the preceding example, an example of the present disclosure provides an ultrasonic data transmission apparatus. The apparatus may be applied to the ultrasonic data transmission method according to the example of FIG. 6. Referring to FIG. 10, the ultrasonic data transmission apparatus 300 may be applied to a receiving terminal, and include: a receiving module 301, a second determination module 302 and a decoding module 303.

The receiving module 301 is configured to receive an ultrasonic transmission signal transmitted by a transmitting terminal.

The second determination module 302 is configured to determine whether the ultrasonic transmission signal is transmitted by at least two ultrasonic signal transmitting arrays in the transmitting terminal.

The decoding module 303 is configured to decode the ultrasonic transmission signal when determining that the ultrasonic transmission signal is transmitted by the at least two ultrasonic signal transmitting arrays in the transmitting terminal.

Figure 11:
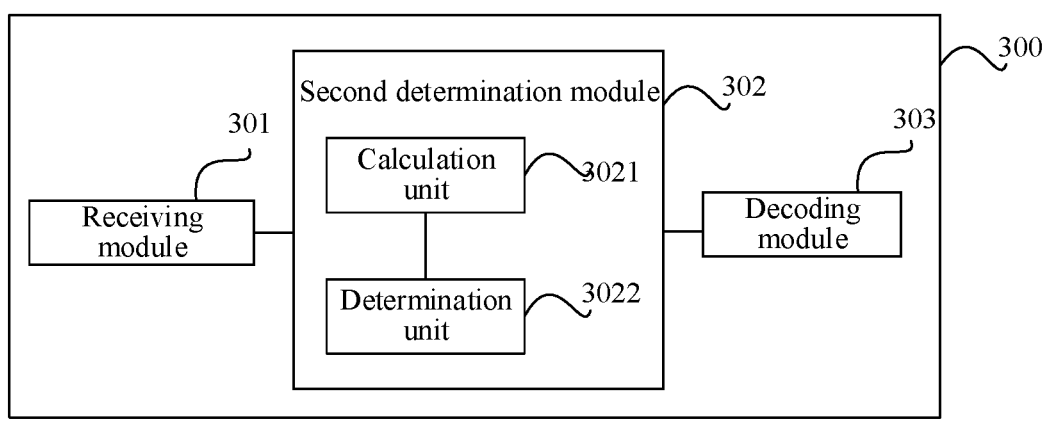
FIG. 11 is a structural diagram of another ultrasonic data transmission apparatus, according to an example of the present disclosure.

Optionally, in another example of the present disclosure, as illustrated in FIG. 11, the second determination module 302 may include: a calculation unit 3021 and a determination unit 3022.

The calculation unit 3021 is configured to perform frequency domain transformation on the ultrasonic transmission signal, and calculate an energy value of each frequency component in the ultrasonic transmission signal subjected to the frequency domain transformation.

The determination unit 3022 is configured to determine, when at least two energy values are greater than a preset energy threshold, that the ultrasonic transmission signal is transmitted by the at least two ultrasonic signal transmitting arrays in the transmitting terminal.

Figure 12:
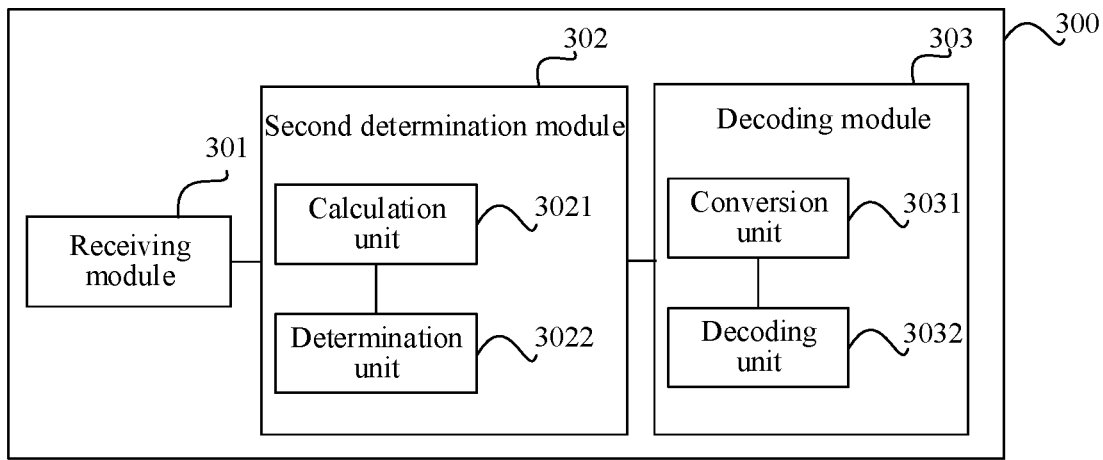
FIG. 12 is a structural diagram of another ultrasonic data transmission apparatus, according to an example of the present disclosure.

Optionally, in another example of the present disclosure, as illustrated in FIG. 12, the decoding module 303 may include: a conversion unit 3031 and a decoding unit 3032.

The conversion unit 3031 is configured to convert the ultrasonic transmission signal into at least two single-frequency ultrasonic coding signals, the at least two single-frequency ultrasonic coding signals being respectively transmitted by the at least two ultrasonic signal transmitting arrays in a focusing manner.

The decoding unit 3032 is configured to acquire any single-frequency ultrasonic coding signal and decode the single-frequency ultrasonic coding signal.

Optionally, the decoding unit 3032 is further configured to detect whether the single-frequency ultrasonic coding signal includes wake-up information; and separate the wake-up information from the single-frequency ultrasonic coding signal when the single-frequency ultrasonic coding signal includes the wake-up information, and decode remaining information except the wake-up information to obtain to-be-transmitted information.

It is to be noted that the descriptions on the same steps and same contents in the example with the other examples may refer to the descriptions in the other examples, and will not be repeated herein.

The example of the present disclosure provides the ultrasonic data transmission apparatus. Single-frequency ultrasonic coding signals of corresponding to-be-transmitted information are transmitted through at least two ultrasonic signal transmitting arrays. Since ultrasonic coding modes of to-be-transmitted information corresponding to different ultrasonic signal transmitting arrays are different, the crack difficulty is increased, and the security of information protection is enhanced. And meanwhile, corresponding at least two single-frequency ultrasonic coding signals are transmitted through the at least two ultrasonic signal transmitting arrays to a receiving terminal in a focusing mode, such that the receiving terminal performs the decoding when receiving the signals transmitted by the at least two ultrasonic signal transmitting arrays, thereby preventing the influence from an interference signal and improving the accuracy of a communication result.

Figure 13:
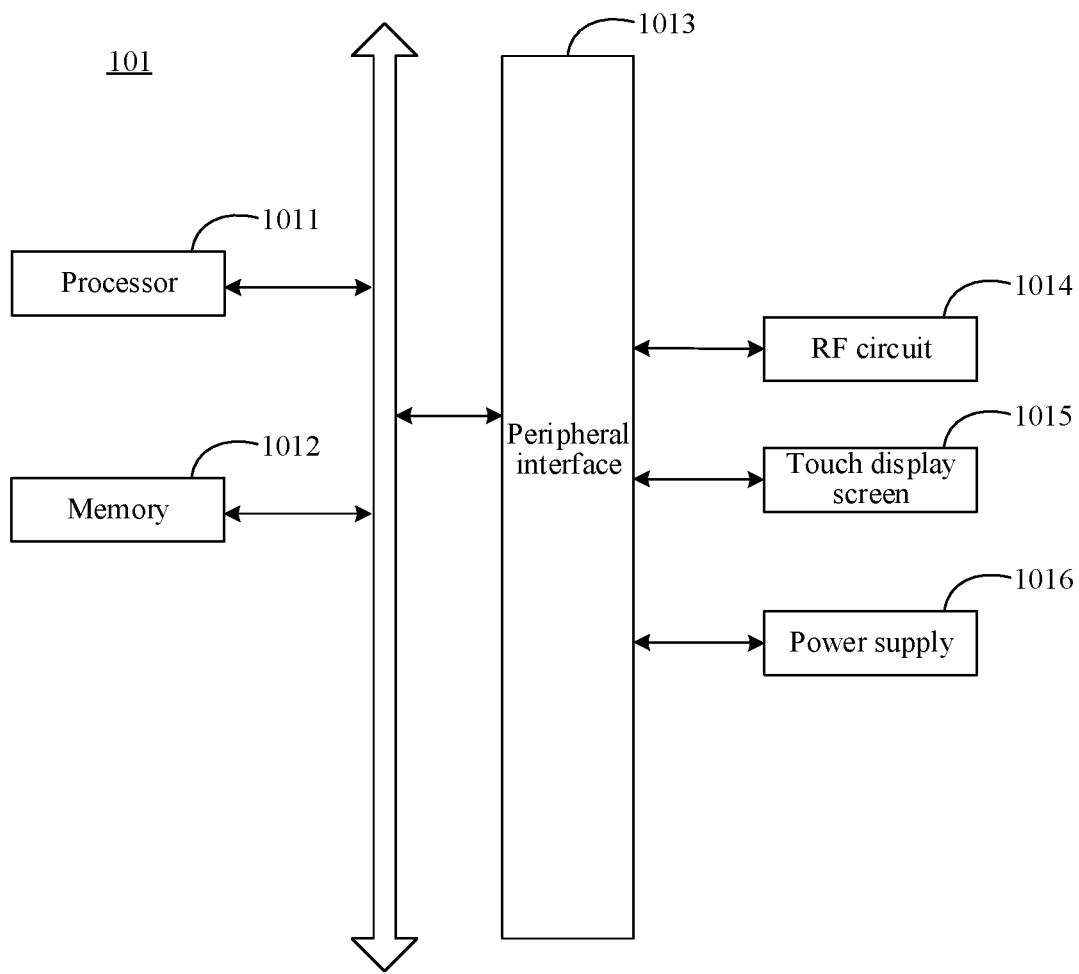
FIG. 13 is a block diagram of a mobile device, according to an example of the present disclosure.

Based on the preceding example, the descriptions are made with the case where the terminal device is the mobile device as an example. Referring to FIG. 13, FIG. 13 is a structural block diagram of a mobile device, according to an example of the present disclosure. The mobile device 101 may include a processor 1011 and a memory 1012. The processor 1011 may include one or more processing cores, such as a 4-core processor, an 8-core processor and the like. The processor 1011 may be implemented by using at least one hardware form of a digital signal processing (DSP), a field programmable gate array (FPGA) or a programmable logic array (PLA).

The processor 1011 may also include a master processor and a co-processor. The master processor is a processor configured to process data in a wake-up state, and is also called a central processing unit (CPU); and the co-processor is a low-power processor configured to process data in a standby state.

In addition, the processor 1011 may be integrated with a graphics processing unit (GPU); and the GPU is configured to render and draw a content to be displayed by a display screen. In some examples, the processor 1011 may further include an artificial intelligence (AI) processor. The AI processor is configured to process a calculating operation relating to machine learning.

The memory 1012 may include one or more computer-readable storage media. The computer-readable storage medium may be non-transitory. The memory 1012 may further include a high-speed random access memory and a non-volatile memory, such as one or more magnetic disk storage devices and flash memory storage devices. In some examples, the non-transitory computer-readable storage medium in the memory 1012 is configured to store at least one program. The at least one program is executed by the processor 1011 to implement the ultrasonic data transmission method provided in any method example of the present disclosure.

In some examples, the mobile device 101 may further include a peripheral interface 1013 and at least one peripheral device. The processor 1011, the memory 1012 and the peripheral device 1013 may be connected via a bus or a signal line. Each peripheral device may be connected to the peripheral interface 1013 via the bus, the signal line or a circuit board.

Specifically, the peripheral device includes, but is not limited to, a radio frequency (RF) circuit 1014, a touch display screen 1015 and a power supply 1016. The peripheral device 1013 may be configured to connect at least one peripheral device relating to input/output (I/O) to the processor 1011 and the memory 1012. In some examples, the processor 1011, the memory 1012 and the peripheral device 1013 are integrated into the same chip or circuit board. In another examples, any one or two of the processor 1011, the memory 1012 and the peripheral device 1013 may be implemented on an individual chip or circuit board, which is not limited in the examples of the present disclosure.

The RF circuit 1014 is configured to receive and transmit an RF signal that is also called an electromagnetic signal. The RF circuit 1014 is communicated with a communication network and other communication devices through the electromagnetic signal. The RF circuit 1014 converts an electrical signal into the electromagnetic signal for sending, or converts received electromagnetic signal into the electrical signal. Optionally, the RF circuit 1014 may include an antenna system, an RF transceiver, one or more amplifiers, a tuner, an oscillator, a digital signal processor, a encoding-decoding chip set, a user identity module card, and the like. The RF circuit 1014 may be communicated with other devices through at least one wireless communication protocol. The wireless communication protocol may include, but is not limited to, a metropolitan area network (MAN), each generation of mobile communication network (2 generation (2G), 3 generation (3G), 4 generation (4G) and 5 generation (5G)), a wireless local area network (WLAN) and/or a WiFi network. In some examples, the RF circuit 1014 may further include a circuit relating to near field communication (NFC).

The display screen 1015 is configured to display a user interface (UI). The UI may include a pattern, a text, an icon, a video and any combination thereof. When the display screen 1015 is a touch display screen, the display screen 1015 further has a capability of collecting a touch signal on or above a surface of the display screen 1015. The touch signal may be used as a control signal to input to the processor 1011 for processing. At this time, the display screen 1015 may further be configured to provide a virtual button and/or virtual keyboard, which is also called a soft button and/or soft keyboard. In some examples, there may be one display screen 1015 that is disposed on a front panel of the mobile device 101. In another examples, there may be at least two display screens 1015 that are respectively arranged on different surfaces of the mobile device 101 or arranged in a foldable mode; and in another examples, the display screen 1015 may be a flexible display screen disposed on a curved surface or a foldable surface of the mobile device 101. Even, the display screen 1015 may be set as a non-rectangular irregular pattern, i.e., a special-shaped screen. The display screen 1015 may be made of materials such as a liquid crystal display (LCD), an organic light-emitting diode (OLED) and the like.

It may be understood by those skilled in the art that the structure illustrated in FIG. 13 does not form a limit to the mobile device 101, and may include more or less components than those in the figure, or combines some components, or is arranged with different components.

As another aspect, an example of the present disclosure provides a computer-readable storage medium, which is configured to store program codes; and the program codes are configured to execute any implementation mode of the ultrasonic data transmission method in the preceding examples.

As another aspect, an example of the present disclosure provides a computer program product including instructions; and when running on a computer, the computer program product causes the computer to execute any implementation mode of the ultrasonic data transmission method in the preceding examples.

It may be clearly understood by those skilled in the art that, for the purpose of convenient and brief description, a detailed working process of the above system, apparatus, and module may refer to a corresponding process in the above method example, and details are not described herein again.

In the several examples provided in the disclosure, it is to be understood that the disclosed system, apparatus, and method may be implemented in other manners. The apparatus example described above is only schematic, and for example, division of the modules is only logic function division, and other division manners may be adopted during practical implementation. For example, multiple modules or components may be combined or integrated into another system, or some characteristics may be neglected or not executed. In addition, the displayed or discussed mutual couplings or direct couplings or communication connections may be implemented through some interfaces. The indirect couplings or communication connections between the apparatuses or modules may be implemented in electronic, mechanical, or other forms. The modules described as separate parts may or may not be physically separate, and parts displayed as modules may or may not be physical units, may be located in one position, or may be distributed on a plurality of network units. Some or all of the units may be selected according to actual needs to achieve the objectives of the solutions of the examples.

In addition, functional units in the examples of the present disclosure may be integrated into one processing unit, or each of the modules may exist alone physically, or two or more modules are integrated into one unit. The integrated units may be implemented in a form of hardware, and may also be implemented in a form of a software functional unit. When the integrated units are implemented in the form of the software functional unit and sold or used as an independent product, the integrated units may be stored in a computer-readable storage medium.

Based on such an understanding, the technical solutions of the present disclosure substantially or parts making contributions to the conventional art or all or parts of the technical solutions may be embodied in form of a software product, and the computer software product is stored in a storage medium, including a plurality of instructions configured to cause computer device (which may be a personal computer, a server, network equipment or the like) to execute all or parts of the ultrasonic data transmission method in each example of the present disclosure. The above storage medium includes: any medium that can store program codes, such as a U disk, a mobile hard disk, a read-only memory (ROM), a random access memory (RAM), a magnetic disk, or an optical disc.

At last, it is to be noted that the above examples are merely used to describe the technical solutions of the present disclosure, rather than to limit the present disclosure. Although the present disclosure is described in detail with reference to the above examples, those skilled in the art should understand that the technical solutions in the above examples may still be modified, or equivalent replacements are made to a part of technical features therein. Those modifications or replacements do not make the essence of the corresponding technical solutions depart from the spirit and scope of the technical solutions of the examples of the present disclosure.

What is claimed is:

1. An ultrasonic data transmission method, comprising:
   determining, by a transmitting terminal comprising at least two ultrasonic signal transmitting arrays, a single-frequency ultrasonic coding signal of to-be-transmitted information corresponding to each ultrasonic signal transmitting array of the at least two ultrasonic signal transmitting arrays, wherein the at least two ultrasonic signal transmitting arrays comprise different ultrasonic signal transmitting arrays, the to-be-transmitted information corresponding to the different ultrasonic signal transmitting arrays is identical and adopts different ultrasonic coding modes, and ultrasonic codes of to-be-transmitted information corresponding to the different ultrasonic signal transmitting arrays are different; and
   transmitting, through the at least two ultrasonic signal transmitting arrays in the transmitting terminal, corresponding at least two single-frequency ultrasonic coding signals to a receiving terminal in a focusing mode, wherein frequency bands of transmitting frequencies of the different ultrasonic signal transmitting arrays are different,
   wherein determining, by the transmitting terminal comprising the at least two ultrasonic signal transmitting arrays, the single-frequency ultrasonic coding signal of the to-be-transmitted information corresponding to each ultrasonic signal transmitting array of the at least two ultrasonic signal transmitting arrays comprises:
   for each ultrasonic signal transmitting array, obtaining sub-digit sequences of the to-be-transmitted information;
   determining, by using a digit-frequency corresponding table, frequency sequences corresponding to the sub-digit sequences;
   exciting the frequency sequences; and
   performing a co-frequency processing by connecting the frequency sequences according to an excitation time sequence of the frequency sequences so as to generate the single-frequency ultrasonic coding signal,
   wherein performing the co-frequency processing by connecting the frequency sequences according to the excitation time sequence of the frequency sequences comprises:
   if adjacent frequency sequences in the frequency sequences have a same frequency, directly connecting the adjacent frequency sequences; and
   if the adjacent frequency sequences in the frequency sequences have different frequencies, connecting the adjacent frequency sequences through frequency shift connection.

2. The ultrasonic data transmission method of claim 1, wherein each ultrasonic signal transmitting array comprises at least one ultrasonic signal transmitter, and the at least one ultrasonic signal transmitter is disposed according to a preset rule.

3. The ultrasonic data transmission method of claim 2, wherein the present rule comprises any one of following rules: a linear arrangement rule, a two-dimensional planar arrangement rule, or a surrounded arrangement rule.

4. The ultrasonic data transmission method of claim 1, wherein the at least two ultrasonic signal transmitting arrays are distributed in an angle of less than 180°.

5. The ultrasonic data transmission method of claim 2, wherein the at least one ultrasonic signal transmitter in a same ultrasonic signal transmitting array adopts a same transmitting frequency.

6. An ultrasonic data reception method, applied to a receiving terminal, comprising:
   receiving an ultrasonic transmission signal transmitted by a transmitting terminal;
   determining whether the ultrasonic transmission signal is transmitted by at least two ultrasonic signal transmitting arrays in the transmitting terminal; wherein the at least two ultrasonic signal transmitting arrays comprise different ultrasonic signal transmitting arrays, the ultrasonic transmission signal transmitted by the different ultrasonic signal transmitting arrays is encoded with different ultrasonic coding modes; and
   decoding the ultrasonic transmission signal when determining that the ultrasonic transmission signal is transmitted by the at least two ultrasonic signal transmitting arrays in the transmitting terminal,
   wherein the ultrasonic transmission signal comprises at least two single-frequency ultrasonic coding signals respectively transmitted by the at least two ultrasonic signal transmitting arrays, and each of the at least two single-frequency ultrasonic coding signals is generated by exciting frequency sequences corresponding to sub-digit sequences and performing a co-frequency processing through connecting the frequency sequences according to an excitation time sequence of the frequency sequences, wherein the frequency sequences are determined by using a digit-frequency corresponding table, and the sub-digit sequences are sub-digit sequences of to-be-transmitted information for each ultrasonic signal transmitting array.

7. The ultrasonic data reception method of claim 6, wherein determining whether the ultrasonic transmission signal is transmitted by the at least two ultrasonic signal transmitting arrays in the transmitting terminal comprises:
performing frequency domain transformation on the ultrasonic transmission signal, and calculating an energy value of a frequency component in the ultrasonic transmission signal subjected to the frequency domain transformation; and
determining, when at least two energy values are greater than a preset energy threshold, that the ultrasonic transmission signal is transmitted by the at least two ultrasonic signal transmitting arrays in the transmitting terminal.

8. The ultrasonic data reception method of claim 6, wherein decoding the ultrasonic transmission signal when the ultrasonic transmission signal is transmitted by the at least two ultrasonic signal transmitting arrays in the transmitting terminal comprises:
converting the ultrasonic transmission signal into the at least two single-frequency ultrasonic coding signals, wherein the at least two single-frequency ultrasonic coding signals are respectively transmitted by the at least two ultrasonic signal transmitting arrays in a focusing manner; and
acquiring a single-frequency ultrasonic coding signal and decoding the single-frequency ultrasonic coding signal.

9. The ultrasonic data reception method of claim 8, wherein acquiring the single-frequency ultrasonic coding signal and decoding the single-frequency ultrasonic coding signal comprises:
detecting whether the single-frequency ultrasonic coding signal comprises wake-up information; and
separating the wake-up information from the single-frequency ultrasonic coding signal when the single-frequency ultrasonic coding signal comprises the wake-up information, and decoding remaining information except the wake-up information to obtain to-be-transmitted information.

10. An ultrasonic data transmission apparatus, applied to a transmitting terminal comprising at least two ultrasonic signal transmitting arrays, comprising:
a processor; and
a memory for storing instructions executable by the processor;
wherein the processor is configured to:
determine a single-frequency ultrasonic coding signal of to-be-transmitted information corresponding to each ultrasonic signal transmitting array of the at least two ultrasonic signal transmitting arrays, wherein the at least two ultrasonic signal transmitting arrays comprise different ultrasonic signal transmitting arrays, the to-be-transmitted information corresponding to the different ultrasonic signal transmitting arrays is identical and adopts different ultrasonic coding modes, and ultrasonic codes of to-be-transmitted information corresponding to the different ultrasonic signal transmitting arrays are different; and
transmit, through the at least two ultrasonic signal transmitting arrays in the transmitting terminal, corresponding at least two single-frequency ultrasonic coding signals to a receiving terminal in a focusing mode, wherein frequency bands of transmitting frequencies of the different ultrasonic signal transmitting arrays are different,
wherein the processor is further configured to:
for each ultrasonic signal transmitting array, obtain sub-digit sequences of the to-be-transmitted information;
determine, by using a digit-frequency corresponding table, frequency sequences corresponding to the sub-digit sequences;
excite the frequency sequences;
perform a co-frequency processing by connecting the frequency sequences according to an excitation time sequence of the frequency sequences so as to generate the single-frequency ultrasonic coding signal,
if adjacent frequency sequences in the frequency sequences have a same frequency, directly connect the adjacent frequency sequences; and
if the adjacent frequency sequences in the frequency sequences have different frequencies, connect the adjacent frequency sequences through frequency shift connection.

11. The ultrasonic data transmission apparatus of claim 10, wherein each ultrasonic signal transmitting array comprises at least one ultrasonic signal transmitter, and the at least one ultrasonic signal transmitter is disposed according to a preset rule.

12. The ultrasonic data transmission apparatus of claim 11, wherein the present rule comprises any one of following rules: a linear arrangement rule, a two-dimensional planar arrangement rule, or a surrounded arrangement rule.

13. The ultrasonic data transmission apparatus of claim 10, wherein the at least two ultrasonic signal transmitting arrays are distributed in an angle of less than 180°.

14. The ultrasonic data transmission apparatus of claim 11, wherein the at least one ultrasonic signal transmitter in a same ultrasonic signal transmitting array adopts a same transmitting frequency.

15. An ultrasonic data reception apparatus implementing operations of the ultrasonic data transmission method of claim 6, applied to a receiving terminal, comprising:
a processor; and
a memory for storing instructions executable by the processor;
wherein the processor is configured to:
receive an ultrasonic transmission signal transmitted by a transmitting terminal;
determine whether the ultrasonic transmission signal is transmitted by at least two ultrasonic signal transmitting arrays in the transmitting terminal; wherein the ultrasonic transmission signal transmitted by different ultrasonic signal transmitting arrays is encoded with different ultrasonic coding modes; and
decode the ultrasonic transmission signal when determining that the ultrasonic transmission signal is transmitted by the at least two ultrasonic signal transmitting arrays in the transmitting terminal.

16. The ultrasonic data reception apparatus of claim 15, wherein the processor is further configured to:
perform frequency domain transformation on the ultrasonic transmission signal, and calculate an energy value of a frequency component in the ultrasonic transmission signal subjected to the frequency domain transformation; and
determine, when at least two energy values are greater than a preset energy threshold, that the ultrasonic transmission signal is transmitted by the at least two ultrasonic signal transmitting arrays in the transmitting terminal.

17. The ultrasonic data reception apparatus of claim 15, wherein the processor is further configured to:
convert the ultrasonic transmission signal into at least two single-frequency ultrasonic coding signals, wherein the at least two single-frequency ultrasonic coding signals are respectively transmitted by the at least two ultrasonic signal transmitting arrays in a focusing manner; and
acquire a single-frequency ultrasonic coding signal and decode the single-frequency ultrasonic coding signal.

18. The ultrasonic data reception apparatus of claim 17, wherein the processor is further configured to:
detect whether the single-frequency ultrasonic coding signal comprises wake-up information; and
separate the wake-up information from the single-frequency ultrasonic coding signal when the single-frequency ultrasonic coding signal comprises the wake-up information, and decode remaining information except the wake-up information to obtain to-be-transmitted information.

* * * * *